United States Patent Office 2,908,719
Patented Oct. 13, 1959

2,908,719

RECOVERY OF DIALKYL ETHERS OF 5-ALKYL-PYROGALLOL BY SOLVENT EXTRACTION OF WOOD TAR DISTILLATE

Herman S. Bloch, Skokie, and Richard C. Wackher, Palatine, Ill., assignors, by mesne assignments, to Universal Oil Products Company, Des Plaines, Ill., a corporation of Delaware No Drawing. Application December 10, 1956
Serial No. 627,146

9 Claims. (Cl. 260—613)

This invention relates to the solvent extraction of wood tar distillate and more particularly to an improvement in the solvent extraction of wood tar distillate to recover dialkyl ethers of 5-alkyl-pyrogallols therefrom.

The dialkyl ethers of 5-alkyl-pyrogallols have been found to be effective non-staining antiozonants for use in retarding the cracking of rubber due to ozone. Because these antiozonants do not impart color to the rubber, they are especially useful in white or light-colored rubber. They also are of especial utility in dark-colored rubber which is molded to or otherwise adjoins light-colored rubber in order that the antiozonant used in such dark-colored rubber does not transfuse into the light colored rubber and impart color thereto. It is understood that the antiozonant also may be used in other dark-colored rubber when desired. The rubber may be of natural or synthetic origin.

The wood tar distillate containing the desired dialkyl ethers of 5-alkyl-pyrogallols is obtained by the distillation of hardwoods including hickory, oak, beech, walnut, etc. The distillate so obtained is a complex mixture of phenolic and non-phenolic compounds, including pyrogallol, 5-alkyl-pyrogallols, monomethyl ether of pyrogallol, monomethyl ethers of 5-alkyl-pyrogallols, dimethyl ethers of pyrogallol, dimethyl ethers of 5-alkyl-pyrogallols, alkylated guaiacols, neutral oils, etc. The separation of the dialkyl ethers of 5-alkyl-pyrogallols is a difficult problem, and the present invention is directed to an improvement in solvent extraction processes for effecting this separation.

In one embodiment the present invention relates to a method for the separation of dialkyl ethers of 5-alkyl-pyrogallols from wood tar distillate which comprises effecting said separation by solvent extracting said wood tar distillate in the presence of both a halogenated solvent and an aqueous solution of an oxygenated solvent.

In a specific embodiment, the present invention relates to an improvement in the separation of dialkyl ethers of 5-alkyl-pyrogallols from settled wood tar distillate which comprises effecting said separation by solvent extracting said settled wood tar distillate in the presence of both carbon tetrachloride and an aqueous solution of methanol.

The wood tar distillate generally is first settled in order to separate a settled tar oil from "soluble oil." This settling may be effected at atmospheric temperature but in many cases preferably is effected at an elevated temperature, which may range up to about 100° C. The settling at elevated temperature also effects removal of volatile components from the wood tar distillate.

While the settled wood tar distillate may be subjected to solvent extraction in accordance with the present invention and subsequently fractionated to separate the desired selected fraction, in a preferred embodiment the settled wood tar distillate is first fractionated, preferably under subatmospheric pressure to avoid destructive reactions during fractionation, to separate a selected fraction, and the selected fraction then is subjected to solvent extraction in the manner herein set forth. In one embodiment the selected fraction has a nominal boiling range of from about 240° to about 320° C. and in another embodiment it has a nominal boiling range of from about 270° to about 305° C., although it may be of any suitable boiling range as desired.

In accordance with the present invention the settled wood tar distillate and preferably the selected fraction thereof is subjected to solvent extraction in the presence of both a halogenated solvent and an aqueous solution of an oxygenated solvent. The use of the multiple solvent system of the present invention offers numerous advantages in the solvent extraction of the wood tar distillate. The wood tar distillate is a viscous material and the use of the halogenated solvent lowers the viscosity of the tar phase and facilitates separation thereof from the aqueous phase. The halogenated solvent increases the density of the tar phase and thereby provides a higher density differential between the tar phase and the aqueous solvent phase, as well as causing a decrease in the interfacial tension between the two phases.

Similarly, the use of an oxygenated compound in the aqueous solvent lowers the density of the aqueous phase and further serves to decrease the interfacial tension between the two phases. In addition, the oxygenated compound increases the solvent power of the water and facilitates extraction of the water-soluble components from the solution thereof in the chlorinated solvent. Thus, it is seen that both the halogenated solvent and the aqueous oxygenated solvent mutually contribute in an interdependent manner to effect improved separation and recovery of the desired dialkyl ethers of 5-alkyl-pyrogallols from the wood tar distillate.

An aqueous solution of any suitable oxygenated solvent may be employed in accordance with the present invention. For the reasons hereinbefore set forth, the oxygenated solvent is water-soluble and preferably has a density below that of water. The oxygenated solvent is selected from alcohols, ketones, glycols, glycol ethers, etc. The preferred alcohol comprises methanol. Other alcohols include ethanol, propanol, isopropanol and the more water-soluble butanols. In general, higher boiling alcohols are not desirable because of the possible azeotrope formation during subsequent separation of the dissolved wood tar from the alcohol in order to recover the alcohol for reuse in the process. Ketones include acetone, methyl ethyl ketone, methyl propyl ketone, diethyl ketone, methyl propyl ketone, ethyl propyl ketone, dipropyl ketone, methyl butyl ketone, ethyl butyl ketone, propyl butyl ketone, dibutyl ketone, etc. In general, the ketones of lower density are preferred for the reasons hereinbefore set forth. The glycols and glycol ethers in general are of higher density than the alcohols and ketones and, therefore, are not as preferred for use in the present invention, although in some cases other advantages for their use offset the disadvantage of the higher density.

Any suitable halogenated solvent possessing the properties hereinbefore set forth—i.e., higher density, lower viscosity, and lower boiling point than the wood tar—may be employed in the present invention. The wood tar distillate is soluble in the halogenated solvent but the water soluble components subsequently are selectively removed from the solution of the wood tar distillate in the halogenated solvent. Thus, the halogenated solvent may be considered to be a raffinate modified in that it serves to modify the raffinate by lowering the viscosity and interfacial tension and increasing the density thereof. A particularly preferred halogenated solvent comprises carbon tetrachloride. Other halogenated solvents include chloroform, ethylene dichlorodide, tetrachlorethane, 1,1,1-trichlorethane, trichlorethylene, etc. Still other halogenated compounds include dichlorodifluoromethane, methylene bromide, etc.

It is understood that the various halogenated solvents and oxygenated solvents hereinbefore set forth are not necessarily equivalent. In some cases, a mixture of halogenate solvents and/or of oxygenated solvents may be employed. The particular halogenated solvent and oxygenated solvent to be employed will depend upon the particular wood tar distillate being subjected to extraction and whether the wide boiling range wood tar distillate or a selected fraction thereof is being so treated.

The solvent extraction is effected in any suitable manner and at atmospheric or superatmospheric temperature and pressure. Ambient temperature generally is preferred, although temperatures up to about 90° C. may be employed. Superatmospheric pressures ranging up to 100 pounds per square inch may be employed, the higher pressures being used particularly at higher temperatures in order to maintain substantially liquid phase in the extraction zone. Because the halogenated solvent serves to lower the viscosity of the wood tar distillate, it generally is preferred to commingle the halogenated solvent with the wood tar distillate and then pass the same in countercurrent contact with the aqueous solution of oxygenated solvent. However, when desired, the halogenated solvent may be introduced directly into the extraction zone. In one embodiment, the extraction zone is a vertical column which contains bubble decks, bubble trays, side-to-side pans, etc., or other suitable means for effecting contact of the wood tar distillate and solvents. In this embodiment, the wood tar distillate preferably in admixture with halogenated solvent, is introduced into the upper portion of the extraction zone, and the aqueous solution of oxygenated solvent is introduced into the lower portion thereof, the latter passing upwardly countercurrently to the descending wood tar distillate. In another method, the wood tar distillate and solvents may be intimately mixed and allowed to settle and separate into phases. The different phases then are each separately withdrawn in any suitable manner, including decantation of the upper layer, draining of the lower layer, etc. In still another method, intimate mixing of the solvent and wood tar distillate may be carried out by centrifugal contacting and also separation of the phases may be effected in this manner.

The aqueous solution of oxygenated solvent may contain from about 5 to about 80% by volume of the oxygenated solvent and preferably from about 10 to about 60% by volume thereof. The proportion of aqueous solution of oxygenated solvent to wood tar distillate to be employed will vary with the particular wood tar distillate and oxygenated compound, but is within the range of from about 0.5 to about 100 volumes and preferably from about 10 to about 50 volumes of aqueous solvent per volume of wood tar distillate. The proportion of halogenate solvent to wood tar distillate similarly will vary with the particular wood tar distillate, with the particular halogenated solvent, and with the operating conditions, but is within the range of from about 0.1 to about 1 volume and preferably from about 0.2 to about 0.6 volumes of halogenated solvent per volume of wood tar distillate.

Following the solvent extraction, the raffinate phase is withdrawn from the extraction zone and is subjected to fractionation to separate the halogenated solvent. As hereinbefore set forth, the halogenated solvent will have a boiling point lower than that of the wood tar distillate and, therefore, may be separated by vaporization and removed as an overhead fraction from the distillation zone. The recovered halogenated solvent preferably is recycled for further use within the process. Similarly, the extract phase withdrawn from the solvent extraction zone is fractionated in order to separate the aqueous-oxygenated solvent from the dissolved wood tar distillate, and the aqueous-oxygenated solvent is recycled within the process for further use. The wood tar distillate extract separated from the aqueous solvent may be used for any desired purpose as, for example, an antioxidant in gasoline, burner oil, grease, etc.

After separation from the halogenated solvent, the raffinate may be subjected to such further treatment as desired in order to insure removal of the undesired components. When the wood tar has not been previously fractionated, this fractionation will include recovery of a selected fraction which will have the correct physical and chemical properties for use as a non-staining antiozonant in rubber.

As hereinbefore set forth, the dialkyl ethers of 5-alkyl-pyrogallols are the effective non-staining antiozonant compounds. The dimethyl ethers which appear to predominate in wood tar distillate include the dimethyl ethers of 5-methyl-pyrogallol and of 5-n-propyl-pyrogallol. It is understood that other dialkyl ethers of 5-alkyl-pyrogallols which are present in the wood tar distillate will be recovered by the novel process of the present invention and these may include one or more of the following: dimethyl ethers of 5-ethyl-pyrogallol, 5-n-butyl-pyrogallol, 5-isobutyl-pyrogallol, 5-n-amyl-pyrogallol, etc., as well as the diethyl ethers and possibly the dipropyl ethers of 5-alkyl-pyrogallols.

The antiozonant recovered by the present invention is utilized in rubber in a concentration of from about 0.25 to about 10% by weight and preferably of from about 2% to about 5% by weight of the rubber hydrocarbon. The antiozonant is utilizable along with other additives incorporated in rubber for specific purposes including, for example, antioxidants, accelerators, softeners, extenders, wax, reinforcing agents, etc.

The following examples are introduced to illustrate further the novelty and utility of the present invention but not with the intention of unduly limiting the same.

*Example I*

A commercial settled wood tar distillate was subjected to fractionation to separate a selected fraction having a nominal boiling range of from about 270° to about 305° C. and a density $d_4^{20°\,C.}$ of 1.1146. It was subjected to solvent extraction at a temperature of 25° C. and a pressure of 15 pounds per square inch gauge in a vertical extraction zone packed with stainless-steel helices. A solution comprising 70% of the wood tar distillate and 30% of carbon tetrachloride was introduced into the upper portion of the extraction zone, and a 20% methanol-water solution was introduced into the lower portion of the extraction zone. The methanol-water solution was used in a proportion of 40 volumes of aqueous solvent per volume of the wood tar-carbon tetrachloride solution.

The raffinate was withdrawn from the lower portion of the extraction zone and was subjected to distillation to remove the carbon tetrachloride. The raffinate recovery in this run amounted to approximately 90% of the dimethyl ethers of 5-alkyl-pyrogallols present in the selected fraction of wood tar distillate and, when used as an additive to rubber, served to retard ozone cracking of the rubber without imparting undesirable color thereto.

In the absence of the carbon tetrachloride, extraction of the same wood tar distillate under otherwise similar conditions was much less efficient, probably because of phase distribution difficulties within the column.

*Example II*

The wood tar distillate used in this example is a commercial settled wood tar distillate which had been fractionated to separate a selected fraction having a nominal boiling range of from about 240° to about 320° C. This fraction is subjected to solvent extraction at ambient temperature and a pressure of 25 pounds per square inch gauge in a vertical extraction zone equipped with bubble decks. A solution comprising 60% of the wood tar distillate and 40% of 1,1,1-trichlorethane is introduced into the upper portion of the extraction zone, and a 40% methanol-water solution is introduced into the lower portion of the extraction zone. The methanol-water solution is used in a proportion of 50 volumes of aqueous solvent per volume of the wood tar-trichlorethane solution.

The raffinate is withdrawn from the lower portion of the extraction zone and is subjected to distillation to remove the 1,1,1-trichlorethane. The raffinate thus recovered is utilized as an antiozonant in light-colored rubber to retard cracking of the rubber due to ozone without imparting undesirable color to the rubber.

We claim as our invention:

1. A process for recovering dialkyl ethers of 5-alkyl-pyrogallols from wood tar distillate containing the same, which comprises contacting said distillate simultaneously with a halogenated hydrocarbon solvent of higher density, lower viscosity and lower boiling point than the distillate and an aqueous solution of an oxygenated solvent selected from the group consisting of alcohols, ketones, glycols and glycol ethers, thereby forming a mixture of the halogenated solvent and the dialkyl ethers of 5-alkyl-pyrogallols, distilling said mixture to vaporize and separate the halogenated solvent from said dialkyl ethers and recovering the latter.

2. The process of claim 1 further characterized in that said halogenated solvent is selected from the group consisting of carbon tetrachloride, chloroform, ethylene dichloride, tetrachlorethane, 1,1,1-trichlorethane, trichlorethylene, dichlorodifluoromethane, and methylene bromide.

3. The process of claim 1 further characterized in that said oxygenated solvent is an alcohol of not more than 4 carbon atoms per molecule.

4. The process of claim 1 further characterized in that the wood tar distillate boils within the range of from about 240° to about 320° C.

5. The process of claim 1 further characterized in that said halogenated solvent is carbon tetrachloride and said oxygenated solvent is methanol.

6. The process of claim 1 further characterized in that said halogenated solvent is 1,1,1-trichlorethane and said oxygenated solvent is methanol.

7. The process of claim 1 further characterized in that said halogenated solvent is chloroform and said oxygenated solvent is methanol.

8. A process for recovering dialkyl ethers of 5-alkyl-pyrogallols from wood tar distillate boiling within the range of from about 240° to about 320° C., which comprises contacting said distillate simultaneously with carbon tetrachloride and an alcohol-water solvent, thereby forming a mixture of carbon tetrachloride and dialkyl ethers of 5-alkyl-pyrogallols, distilling said mixture to vaporize and separate the carbon tetrachloride from said dialkyl ethers and recovering the latter.

9. The process of claim 8 further characterized in that the alcohol of said solvent is methanol.

References Cited in the file of this patent

UNITED STATES PATENTS

| | | |
|---|---|---|
| 2,245,945 | Van Dijck et al. | June 17, 1941 |
| 2,246,973 | Camilli et al. | June 24, 1941 |
| 2,358,979 | Isham et al. | Sept. 26, 1941 |

OTHER REFERENCES

Hunter et al.: Jour. Amer. Chem. Soc., vol. 61 (1939), pp. 516–520.